(12) United States Patent
Newton et al.

(10) Patent No.: US 11,396,326 B2
(45) Date of Patent: Jul. 26, 2022

(54) AUTONOMOUS VEHICLE HAVING INDEPENDENT STEERING

(71) Applicants: Dean Newton, Osawatomie, KS (US); Chris Booth, Lawrence, KS (US); Per-Erik Johansson, Lidhult (SE); Hans Philip Zachau, Gothenburg (SE); Robert Bourghardt, Gothenburg (SE)

(72) Inventors: Dean Newton, Osawatomie, KS (US); Chris Booth, Lawrence, KS (US); Per-Erik Johansson, Lidhult (SE); Hans Philip Zachau, Gothenburg (SE); Robert Bourghardt, Gothenburg (SE)

(73) Assignee: Cargotec Patenter AB, Kista (SE)

( * ) Notice: Subject to any disclaimer, the term of this patent is extended or adjusted under 35 U.S.C. 154(b) by 180 days.

(21) Appl. No.: 16/688,421

(22) Filed: Nov. 19, 2019

(65) Prior Publication Data

US 2020/0164918 A1 May 28, 2020

Related U.S. Application Data

(60) Provisional application No. 62/772,453, filed on Nov. 28, 2018.

(51) Int. Cl.
*B62D 13/04* (2006.01)
*B62D 53/08* (2006.01)
*B62D 13/02* (2006.01)
*B66F 9/075* (2006.01)
*B62D 7/15* (2006.01)

(52) U.S. Cl.
CPC ........... *B62D 7/1509* (2013.01); *B62D 13/02* (2013.01); *B62D 13/04* (2013.01); *B62D 53/0821* (2013.01); *B62D 53/0864* (2013.01); *B66F 9/07568* (2013.01)

(58) Field of Classification Search
CPC .... B62D 7/1509; B62D 7/1545; B62D 13/04; B62D 53/0864
USPC .......................................................... 180/408
See application file for complete search history.

(56) References Cited

U.S. PATENT DOCUMENTS

| | | | |
|---|---|---|---|
| 5,284,356 A | 2/1994 | Heider et al. | |
| 5,297,911 A | 3/1994 | Powell | |
| 5,330,222 A | 7/1994 | Halverson et al. | |
| 5,873,592 A | * 2/1999 | Daenens | B62D 13/04 280/410 |
| 7,111,862 B1 | 9/2006 | Eng | |
| 7,506,886 B2 | 3/2009 | Warnock | |

(Continued)

FOREIGN PATENT DOCUMENTS

| | | |
|---|---|---|
| JP | 2006-192974 A | 7/2006 |
| KR | 10-1996-0007073 | 5/1996 |

(Continued)

*Primary Examiner* — Tony H Winner
(74) *Attorney, Agent, or Firm* — Reinhart Boerner Van Deuren P.C.

(57) ABSTRACT

A terminal tractor includes four independently steerable wheels, each with their own dedicated drive motor and each with their own dedicated steering device. The terminal tractor includes a controller operable to provide input commands to the drive motors and to the steering devices to operate the terminal tractor. The terminal tractor also includes a fifth wheel coupling which includes a lifting mechanism capable of raising and lowering the fifth wheel coupling a in single vertical direction.

20 Claims, 9 Drawing Sheets

(56) References Cited

U.S. PATENT DOCUMENTS

| | | |
|---|---|---|
| 8,967,939 B2 | 3/2015 | Hammonds |
| 2003/0132604 A1 | 7/2003 | Evans |
| 2004/0230361 A1* | 11/2004 | Oshima ............... B62D 7/1509 |
| | | 701/69 |
| 2004/0238259 A1* | 12/2004 | Itoh ..................... B62B 3/001 |
| | | 180/408 |
| 2006/0037787 A1 | 2/2006 | Hammonds |
| 2007/0114759 A1 | 5/2007 | Biondi et al. |
| 2011/0072999 A1* | 3/2011 | Banwart ............... B61D 3/184 |
| | | 104/26.1 |
| 2011/0074132 A1 | 3/2011 | Banwart |
| 2011/0266774 A1* | 11/2011 | Gregg ..................... B62D 13/00 |
| | | 280/419 |
| 2012/0059549 A1* | 3/2012 | Noel ..................... B62D 3/02 |
| | | 701/41 |
| 2012/0067653 A1* | 3/2012 | Mallett .................. B60S 13/00 |
| | | 180/6.5 |
| 2015/0210326 A1 | 7/2015 | Sponselee |
| 2019/0233034 A1* | 8/2019 | Viele .................... B62D 49/007 |
| 2021/0114422 A1* | 4/2021 | Goodarzi ............... B62D 53/08 |

FOREIGN PATENT DOCUMENTS

| | | |
|---|---|---|
| KR | 10-0621638 | 9/2006 |
| KR | 10-2016-0034665 | 3/2016 |
| KR | 10-2018-0052880 | 5/2018 |

* cited by examiner

AUTONOMOUS VEHICLE HAVING INDEPENDENT STEERING

CROSS-REFERENCE TO RELATED PATENT APPLICATIONS

This patent application claims the benefit of U.S. Provisional Patent Application No. 62/772,453, filed Nov. 28, 2018, the entire teachings and disclosure of which are incorporated herein by reference thereto.

FIELD OF THE INVENTION

This invention relates to ground vehicles, and more particularly to terminal tractor vehicles used for towing semi-trailers.

BACKGROUND OF THE INVENTION

Terminal tractors are semi-tractor vehicles used for moving semi-trailers about a cargo holding area, a warehouse facility, intermodal facility, or other similar locations. Such vehicles provide an efficient means to rapidly move and reposition such semi-trailers for subsequent operations. These vehicles typically have a small single person cab and operate using a low-power diesel or alternative fuel engine.

Advantageously, such vehicles typically include a fifth wheel coupling for coupling to a kingpin of a semi-trailer. The fifth wheel coupling typically includes an integrated lifting mechanism. This lifting mechanism allows the semi-trailer's legs to remain in their lowered position during movement. Put differently, the fifth wheel coupling can be lifted upwards to connect to the kingpin and to lift the semi-trailer to such an extent that it no longer rests upon its legs. This creates a ground clearance that allows the terminal tractor to then tow the semi-trailer to a desired location.

Such terminal tractors, while a useful expedient for moving semi-trailers as described above, are not without some drawbacks. As one example, such vehicles are typically front wheel steer. As such, terminal tractors have the same turning radius limitations as any other front-wheel steer vehicle. This minimum turn radius of the tractor trailer ultimately dictates how close semi-trailers can be situated to one another, which in turns limits how many semi-trailers may be located in a given area.

Further, such vehicles are typically manually operated and thus must be manned via a human operator. This increases their cost of operation, and also creates a possibility for operator error. As yet another example, the above mentioned lifting mechanisms involve multiple linkages to the fifth wheel coupling. This relative complexity results in the fifth wheel coupling be situated off of the center point between the four wheels of the terminal tractor. This off centering creates a larger than desirable turning radius for the vehicle and thus compounds the turn radius issues mentioned above.

Accordingly, there is a need in the art for a terminal tractor which addresses the above drawbacks to provide a vehicle with an enhanced turning radius and other enhanced operational characteristics. The invention provides such a terminal tractor. These and other advantages of the invention, as well as additional inventive features, will be apparent from the description of the invention provided herein.

BRIEF SUMMARY OF THE INVENTION

In one aspect, the invention provides a terminal tractor which advantageously provides a desirable turn radius by way of a four wheel steering system. An embodiment of a terminal tractor according to this aspect includes a chassis, a first axle carrying a first pair of wheels mounted to the chassis, and a second axle carrying a second pair of wheels mounted to the chassis. This embodiment of a terminal tractor also includes a plurality of drive motors. Each drive motor is associated with each one of the first pair of wheels and with each one of the second pair of wheels, respectively, to rotate said pairs of wheels relative to their associated first or second axle. This embodiment of a terminal tractor also includes a plurality of steering devices. Each steering device is associated with each one of the first pair of wheels and with each one of the second pair wheels, respectively, to independently steer each one of the first pair of wheels and each one of the second pair of wheels. The terminal tractor also includes a controller in communication with said plurality of drive motors and said plurality of steering devices as well as a fifth wheel coupling configured for coupling to a kingpin of a semi-trailer.

In an embodiment according to this aspect, the controller is in communication with said plurality of drive motors and said plurality of steering devices to provide a drive input to each one of the plurality of drive motors and a steering input to each one of the plurality of steering devices.

In an embodiment according to this aspect, the fifth wheel coupling includes a lifting mechanism that is configured to transition a coupling body of the fifth wheel coupling from a lowered position to a raised position and from the raised position to the lowered position by moving the coupling body in a single vertical direction.

In an embodiment according to this aspect, the terminal tractor also includes a control head that provides at least one of an air brake and an electrical connection for connecting to the semi-trailer. The control head may be foldable between upright and collapsed positions.

In an embodiment according to this aspect, the plurality of drive motors are electric drive motors. The terminal tractor may also include a power source carried by the chassis that provides power to said plurality of drive motors, plurality of steering devices, and controller. The power source may for non-limiting example be an electric power source.

In an embodiment according to this aspect, each one of the plurality of steering devices includes a servo motor associated with each one of first pair of wheels and each one of the pair of second wheels, respectively, such that the first pair of wheels and second pair of wheels are independently steerable.

In another aspect, the invention provides a terminal tractor which advantageously utilizes an on-board controller to operate the terminal tractor such that a human operator on board on the terminal tractor is not required. An embodiment of a terminal tractor according to this aspect includes a chassis, a first axle carrying a first pair of wheels mounted to the chassis, and a second axle carrying a second pair of wheels mounted to the chassis. This embodiment also includes a plurality of drive motors and a plurality of steering devices. A controller is in communication with the plurality of drive motors and the plurality of steering devices to provide a drive input to each one of the plurality of drive motors and a steering input to each one of the plurality of steering devices. This embodiment also includes a fifth wheel coupling configured for coupling to a kingpin of a semi-trailer.

In an embodiment according to this aspect, each drive motor is associated with each one of the first pair of wheels and with each one of the second pair of wheels, respectively, to rotate said pairs of wheels relative to their associated first or second axle.

In an embodiment according to this aspect, each steering device is associated with each one of the first pair of wheels and with each one of the second pair wheels, respectively, to independently steer each one of the first pair of wheels and each one of the second pair of wheels.

In an embodiment according to this aspect, the controller may be configured to operate the terminal tractor autonomously, or operate the terminal tractor based upon input commands provided by a user remotely.

In an embodiment according to this aspect, the fifth wheel coupling includes a lifting mechanism that is configured to transition a coupling body of the fifth wheel coupling from a lowered position to a raised position and from the raised position to the lowered position by moving the coupling body in a single vertical direction.

In an embodiment according to this aspect, each one of the plurality of steering devices includes a servo motor associated with each one of first pair of wheels and each one of the pair of second wheels, respectively, such that the first pair of wheels and second pair of wheels are independently steerable.

In yet another aspect, the invention provides a terminal tractor with a fifth wheel coupling that advantageously employs a vertically acting mechanism having a small package size, which permits locating the fifth wheel coupling, and more particularly a coupling point of the fifth wheel coupling at a center of the terminal tractor. An embodiment of a terminal tractor according to this aspect includes a chassis, a first axle carrying a first pair of wheels mounted to the chassis, and a second axle carrying a second pair of wheels mounted to the chassis. This embodiment also includes a plurality of drive motors and a plurality of steering devices. A controller is in communication with said plurality of drive motors and said plurality of steering devices. This embodiment also includes a fifth wheel coupling configured for coupling to a kingpin of a semi-trailer. The fifth wheel coupling includes a lifting mechanism that is configured to transition a coupling body of the fifth wheel coupling from a lowered position to a raised position and from the raised position to the lowered position by moving the coupling body in a single vertical direction.

In an embodiment according to this aspect, each drive motor is associated with each one of the first pair of wheels and with each one of the second pair of wheels, respectively, to rotate said pairs of wheels relative to their associated first or second axle. Each steering device is associated with each one of the first pair of wheels and with each one of the second pair wheels, respectively, to independently steer each one of the first pair of wheels and each one of the second pair of wheels.

In an embodiment according to this aspect, the controller is in communication with said plurality of drive motors and said plurality of steering devices to provide a drive input to each one of the plurality of drive motors and a steering input to each one of the plurality of steering devices. In an embodiment according to this aspect, the terminal tractor may include a power source carried by the chassis that provides power to said plurality of drive motors, plurality of steering devices, and controller.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
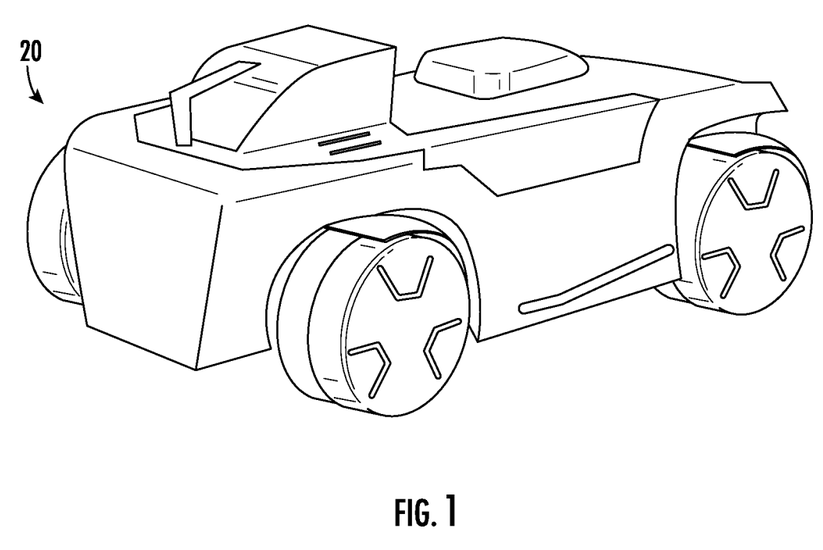
FIG. 1 is a perspective view of an exemplary embodiment of a terminal tractor according to the teachings herein.

Turning now to the drawings, FIG. 1 illustrates an automated terminal tractor 20 which advantageously provides a highly mobile and modular platform that presents enhanced turning and fifth wheel functionality. While shown with various cosmetic coverings and features, such coverings and features are entirely optional. As may be surmised from inspection of FIG. 1, terminal tractor 20 is a wheeled vehicle. As will be explained in greater detail below, terminal tractor 20 utilizes a four wheel steering configuration to provide a highly mobile platform capable of maneuvering in small spaces. Terminal tractor 20 also utilizes a fifth wheel coupling which is movable in a single vertical direction by utilizing a highly compact and direct acting lifting mechanism. These features, among others, provide distinct advantageous over prior designs which do not include such four wheel steering capabilities or utilize more complex lifting mechanisms for their fifth wheel couplings.

Figure 2:
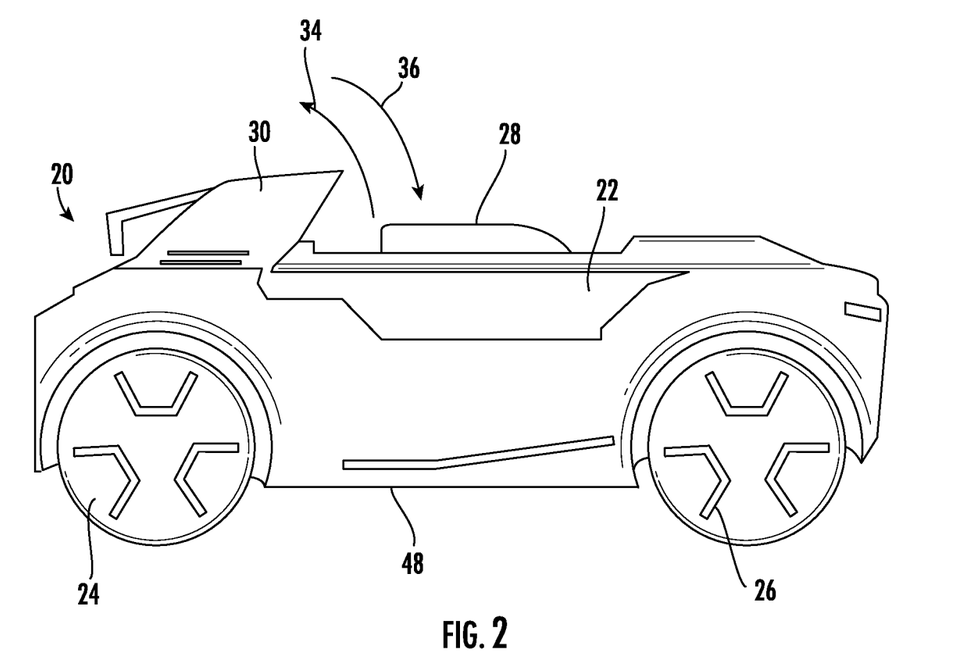
FIG. 2 is a side view of the terminal tractor of FIG. 1.

With particular reference to FIG. 2, terminal tractor 20 includes a chassis 22, a first pair of wheels 24, and a second pair of wheels 26 as shown. As will explained below, a drive motor is associated with each one of the wheels 24, 26 to independently provide a drive input to the same. A fifth wheel coupling 28 is also mounted to chassis 22 and is used to connect to a kingpin of semi-trailer.

Terminal tractor 20 may also include a control head 30 which provides connection points to at least one of an air brake line or an electrical connection of a semi-trailer connected to terminal tractor 20. Control head 30 may be foldable in direction 34 from its stowed position shown in FIG. 2 to an upright position such that it has a generally vertical presentation. Control head 30 may also be moved in direction 36 from the upright position to its stowed position. This folding functionality may be achieved by any known mechanical expedient such as motors and optionally associated linkages.

Control head 30 may also include communication devices such as antenna, transmitters, and receiving for communicating with any other devices. For non-limiting example, control head 30 may contain the componentry necessary for receiving GPS signals, as well as the componentry necessary for communicating with a network, e.g. a cellular or local area network using any known means of communication over such a network. Control head 30 may also package some or all of the sensor devices needed for the autonomous or remote operation of terminal tractor 20, such as vision systems, anti-collision systems, sonar devices, etc. Still further, control head 30 may include solar power panels for charging an onboard power source 48. It is also contemplated that all of the componentry of control head 30 may be housed elsewhere in terminal tractor 20 in those embodiments which do not include a control head.

A power source 48 may also be connected to chassis 22. This power source may for example be an electric power source using batteries, nitrogen, hydrogen, fuel cells, or any combination thereof. Power source 48 is modular in that it may be readily removed and replaced from terminal tractor 20 in much the same way a battery is removable and readily replaceable from a device. To that end, power source 48 may include one or more sub-modules which mount to chassis at different locations 22. Further power source 48 may include provisions for connecting to a charging station to recharge it. It is also contemplated that terminal tractor 20 may draw power via induction using an electric road or rail configuration.

Figure 3:
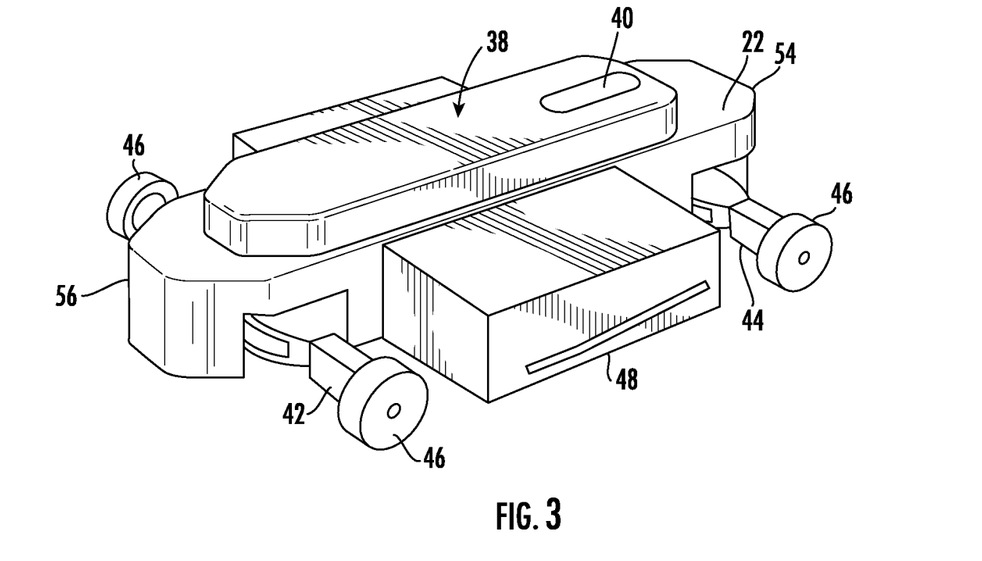
FIGS. 3 and 4 are perspective views of a chassis and associated componentry of the terminal tractor of FIG. 1.

Turning now to FIG. 3, the same shows terminal tractor 20 with its wheels 24, 26 and cosmetic coverings removed. Chassis 22 functions as a central frame and may be made of a high strength steel or other allow to present a light yet rigid frame. Chassis 22 may include an internal cavity or region 38.

A controller 40 may be housed in this internal cavity 38. "Controller" as used herein is meant to include all of the firmware, software, and hardware needed to control and operate the terminal tractor 20, including but not limited to its autonomous or remote operability. Controller 40 is designed to communicate with all the sensors of terminal tractor 20 necessary to effectuate its autonomous operation as inputs, and send control signals as outputs.

Controller 40 also incorporates all of the means necessary for communicating with users as well as other machines. As such, controller 40 may include artificial intelligence programming to achieve such ends. As a non-limiting example, controller 40 may include programming allowing it to receive a job or command list, such as a list of pickup and subsequent drop off locations for semi-trailers. Controller 40 is operable to autonomously control terminal tractor 20 to execute the details of such a command list. In operating as such, controller 40 is operable to interpret the information it receives from the various sensory systems of terminal tractor 20. Controller 40 is designed to be modular in that it may be readily removed from chassis 22 for updates and maintenance.

A first axle 42 for carrying the first pair of wheels 24 (see FIG. 2) is mounted to chassis 22. "Wheel" or "wheels" as used herein includes a single wheel, or a multiple wheel configuration. For example, the first pair of wheels 24 is mounted to first axle 42 such that one wheel 24 is at one end of first axle 42, while the other wheel 24 is at the other end of first axle 42. Each wheel at each end may encompass a single wheel, or a multiple wheel (e.g. a dual wheel) configuration.

In an identical fashion, a second axle 44 is mounted to chassis 22 and is used to carry the second pair of wheels 26. Axles 42, 44 may be embodied for example as pendulum axles to ensure that a terminal tractor 20 maintains good ground contact using all four wheels 24, 26, despite uneven terrain.

As may be seen in FIG. 3, a plurality of drive motors 46 are also provided. A drive motor 46 is respectively associated with each wheel 24, 26 as shown. The drive motors draw power from power source 48 and are controlled by controller 40 to ultimately rotate their respective wheel 24, 26 about its respective axle 42, 44. Drive motors 46 may be embodied by any rotary electric drive motor. Additionally, one or more radiators or other similar cooling devices 54, 56 may be provided on chassis 22 to provide cooling to terminal tractor 20.

Figure 4:
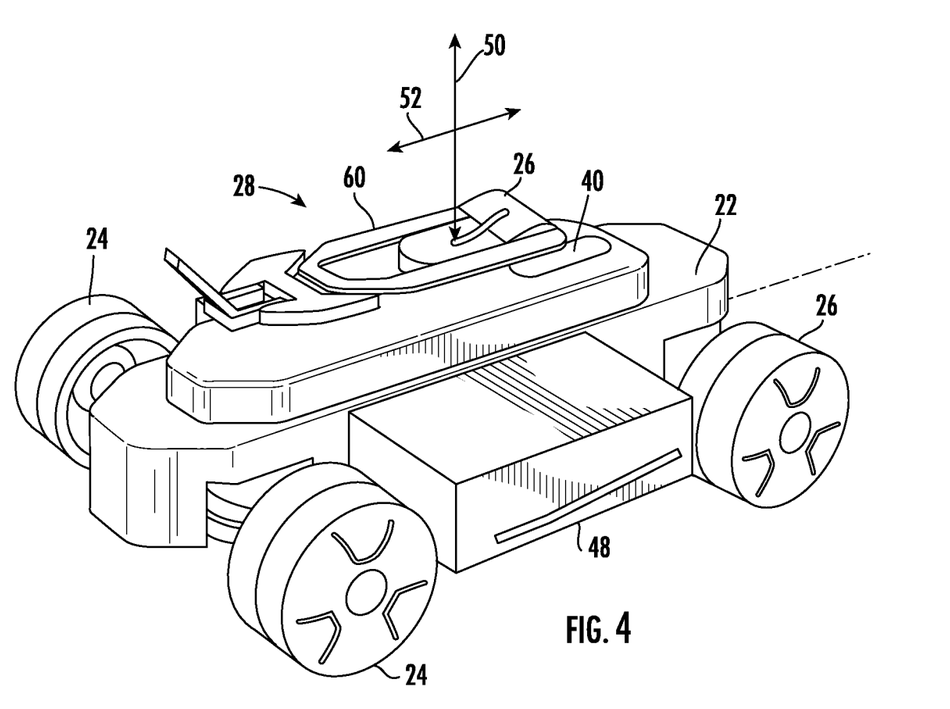

Turning now to FIG. 4, as mentioned above, terminal tractor 20 includes a fifth wheel coupling 28 for connecting to a kingpin of a semi-trailer. Fifth wheel coupling includes a lifting mechanism described below, as well as a coupling body 60 which mates with the aforementioned kingpin. Coupling body 60 may also provide a mounting location for the above discussed control head 30. Alternatively, control head 30 may mount to chassis 22.

Lifting mechanism is operable to raise and lower coupling body in a single vertical direction generally denoted by axis 50 shown in FIG. 4. By "single vertical direction" it is meant that the coupling body 60, and more particularly a coupling point 62 (see FIG. 5) moves linearly up and down with a single component directional vector. This is a departure from prior designs which typically move their coupling body in a directional vector having multiple directional components.

Indeed, many existing designs move the coupling body along an arcuate path. Such motion requires a more complex mechanism, and results in the coupling point of the coupling body being offset from the center defined between the wheels of such existing terminal tractors. Due to this offset, such existing terminal tractors inherently have a larger turning radius when connected to a semi-trailer. In other words, more front end clearance is needed for the terminal tractor to turn as it pulls the semi-trailer.

In the illustrated embodiment, the lifting mechanism may achieve such purely vertical motion along axis 50 by way of a linear actuator acting directly underneath coupling body 60 to move the same vertically up and down. Additionally, an additional mechanism may be employed to shift coupling body 60 along axis 52. Still further, coupling body 60 may be rotatable about axis 50 to reposition the opening of coupling body for receiving the kingpin, and also rotatable about an axis normal to the plane of axes 50, 52 to allow coupling body 60 to tilt.

Still referring to FIG. 4, wheels 24, 26 may incorporate any type of tire, the selection of which will depend largely upon operational environment. As one non-limiting example, these tires may be non-air tires which provide enhanced durability and traction and are lower in maintenance requirements than their air filled counterparts. A cone design may also be employed which improves four wheel steering capabilities and allows for excellent turning angles.

Figure 5:
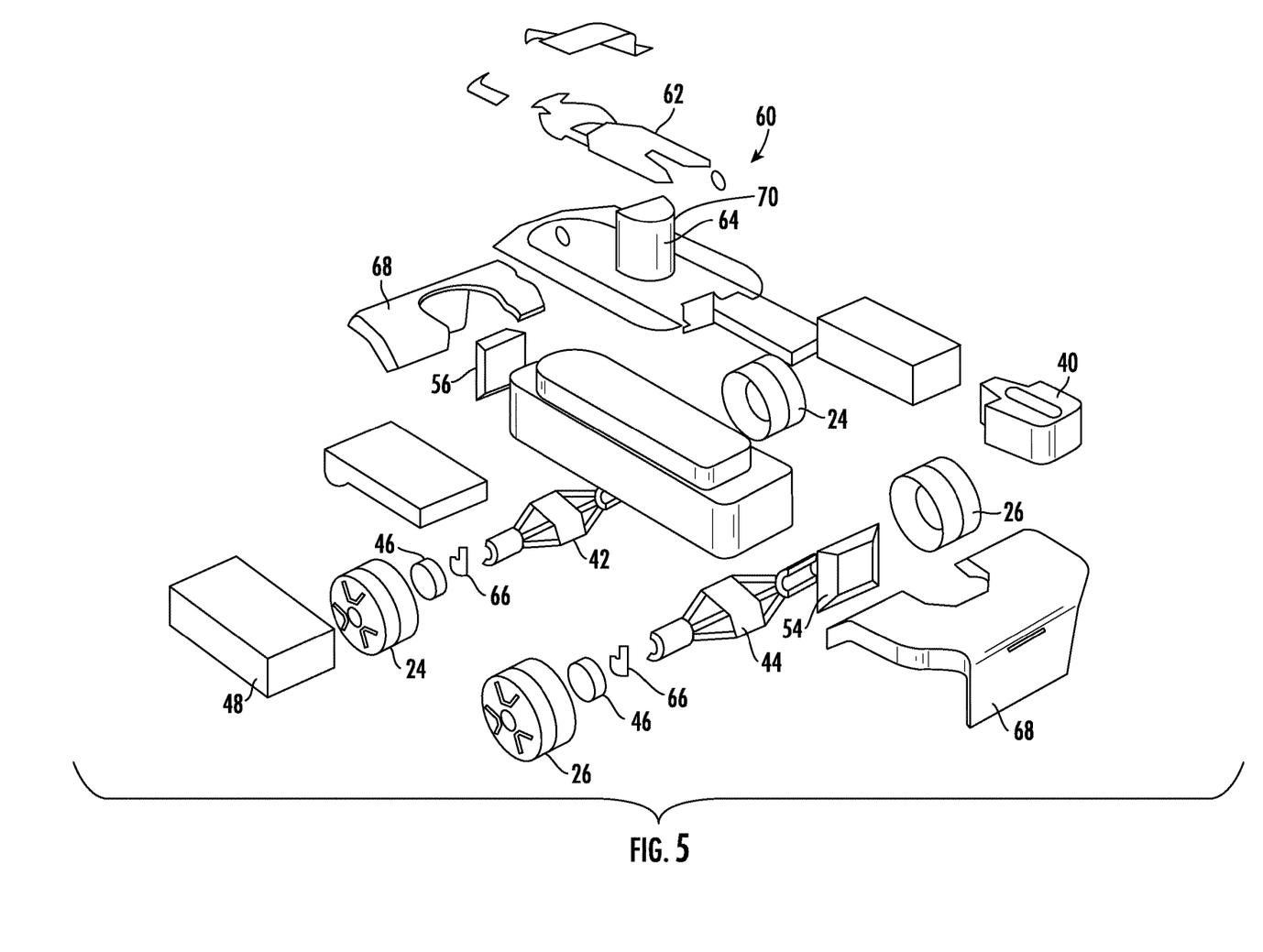
FIG. 5 is an exploded view of the terminal tractor of FIG. 1.

Turning now to the exploded view illustrated in FIG. 5, lifting mechanism 64 is generally illustrated as a linear cylinder lifting mechanism, e.g. a linear actuator. This may be an electric, hydraulic, or pneumatic actuator. In the case of hydraulics or pneumatics, terminal tractor 20 will also include a hydraulic or pneumatic system. As mentioned above, this lifting mechanism 64 acts directly on coupling body 60 to linearly move coupling point 62 in a single vertical direction.

Terminal tractor 20 also includes a plurality of steering devices 66, two of which are shown exploded relative to their associated wheels 24, 26 and associated axles 42, 44. Indeed, each wheel 24, 26, includes its own local steering device 66 in the same manner as each wheel includes its own drive motor 46. These steering devices may for example be servo motors operable to turn its respectively associated wheel 24, 26 relative to that wheel's 24, 26 associated axle. The steering devices 66 receive steering input commands from controller 40 and are independently movable relative to one another. As such, it is possible for each wheel 24, 26 to have a different orientation thus opening a variety of steering capabilities.

Figure 6:
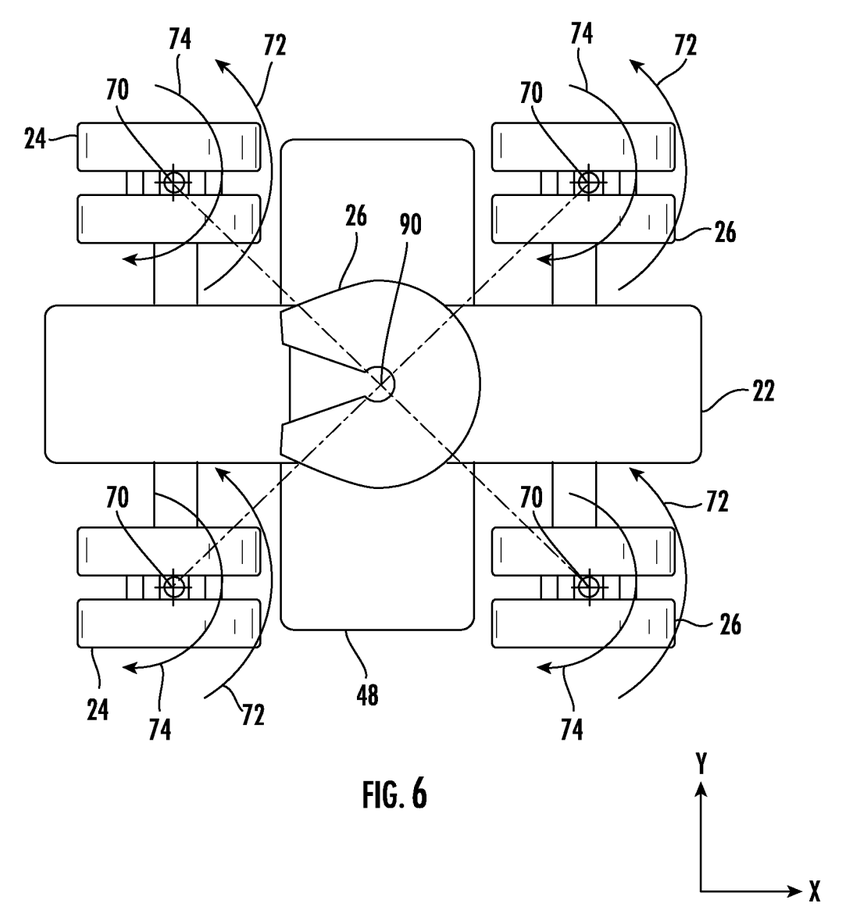
FIG. 6 is a top view schematic illustration of the terminal tractor of FIG. 1.

Indeed, and turning now to FIG. 6, each wheel 24, 26 has a center point 70. The steering devices 66 are operable to rotate each wheel about its center point 70 in directions 72, 74 as shown. Also as will be discussed below, a center 90 of coupling point 62 of coupling body 60 is centered between the first pair of wheels 24 and second pair of wheels 26 in the y direction in FIG. 6, and centered between the first pair of wheels 24 and second pair of wheels in the x direction in FIG. 6.

Figure 7:
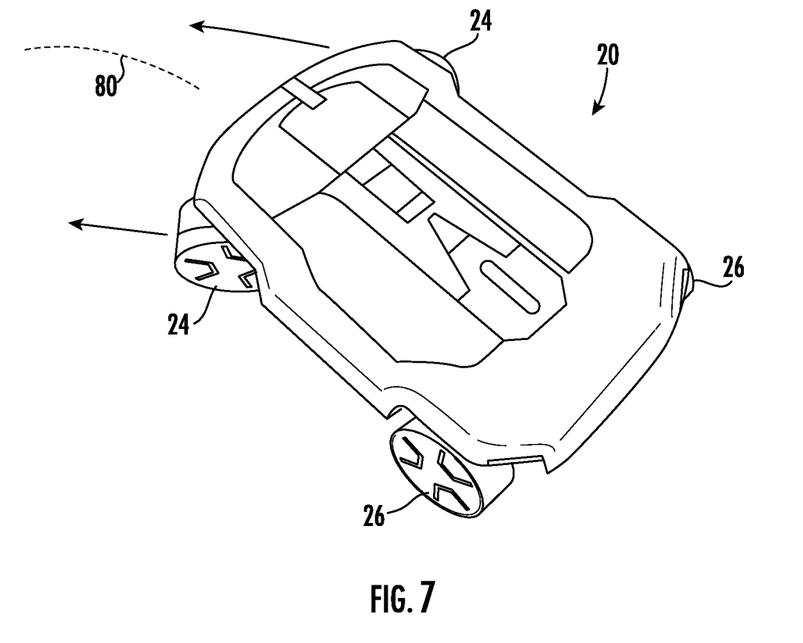
FIGS. 7-10 are perspective view of the terminal tractor of FIG. 1 in various steering configurations.
Figure 8:
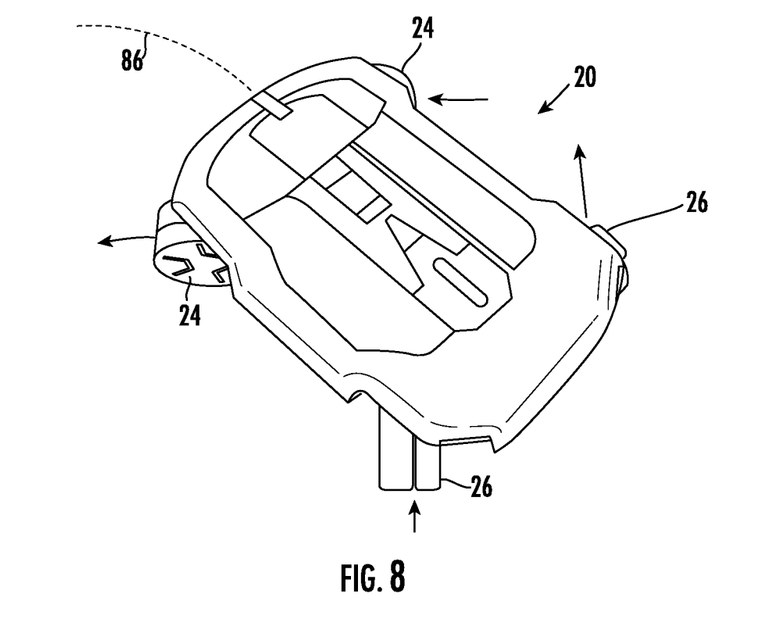

FIG. 7 illustrates a basic front wheel steering operation of terminal tractor 20. The first pair of wheels are oriented in the direction shown, allowing for travel along curved path 80. However, due to the above introduced four wheel steering capabilities, it is also possible to have a much tighter turn radius than curved path 80. Indeed, turning now to FIG. 8, by independently positioning wheels 24, 26 as shown, terminal tractor 20 can make a much tighter turn represented by curved path 86 in FIG. 8.

Figure 9:
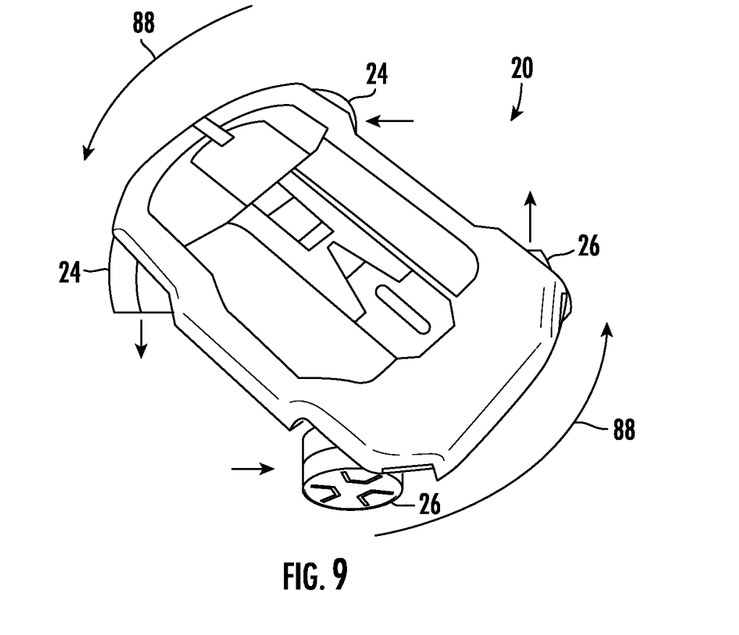
Figure 10:
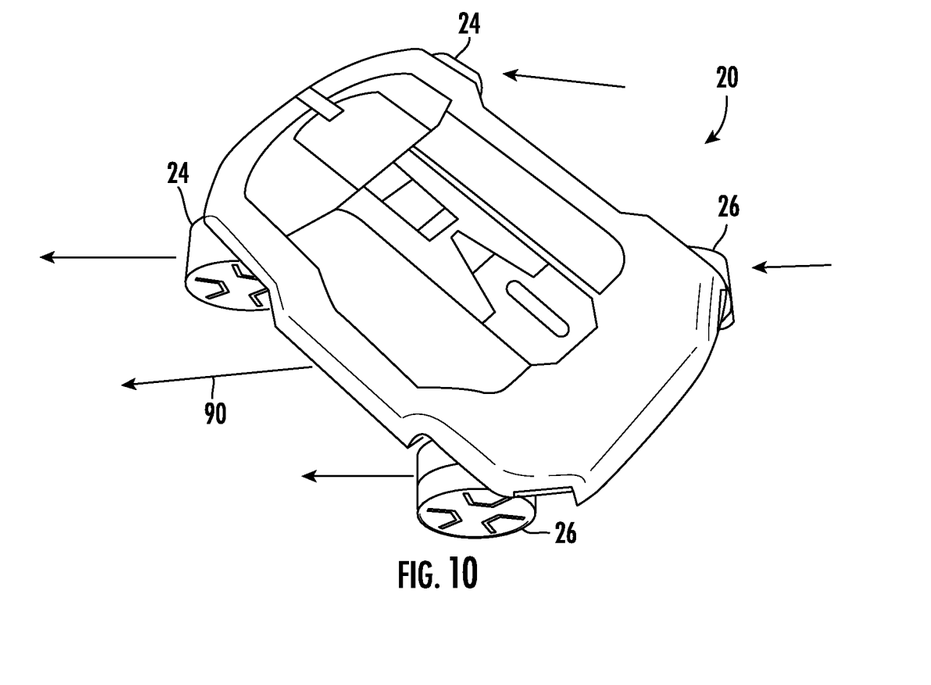

Still further, zero-point turning is also possible as is shown in FIG. 9. Indeed, wheels 24, 26 may be oriented as illustrated to allow terminal tractor 20 to rotate in place about fifth wheel coupling 28 (see FIG. 1) as is represented by directional arrows 88. It is also possible for terminal tractor 20 to employ a crab-style steering as is shown in FIG. 10 wherein a front of terminal tractor 20 is not in line with the direction of travel 90 as is shown. Such a configuration is particularly useful for connecting to a kingpin while being prepositioned in a turning direction.

Figure 11:
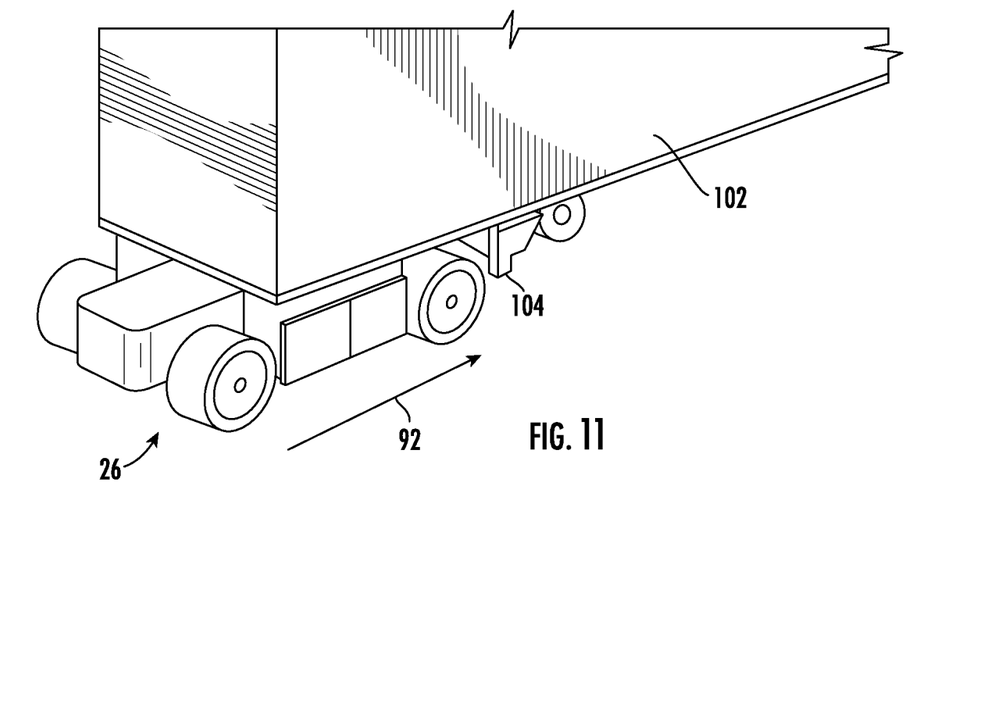
FIGS. 11-14 are perspective views of the terminal tractor of FIG. 1 connected to a semi-trailer and executing a turning operation.

FIGS. 11-14 illustrate the above described four wheel steering functionality in the context of a semi-trailer 102. In FIG. 11, terminal tractor 20 (schematically illustrated) has approached semi-trailer 102 in direction 92 as it is resting on its legs 104. In this configuration, terminal tractor 20 is connected to the kingpin of semi-trailer 102.

Figure 12:
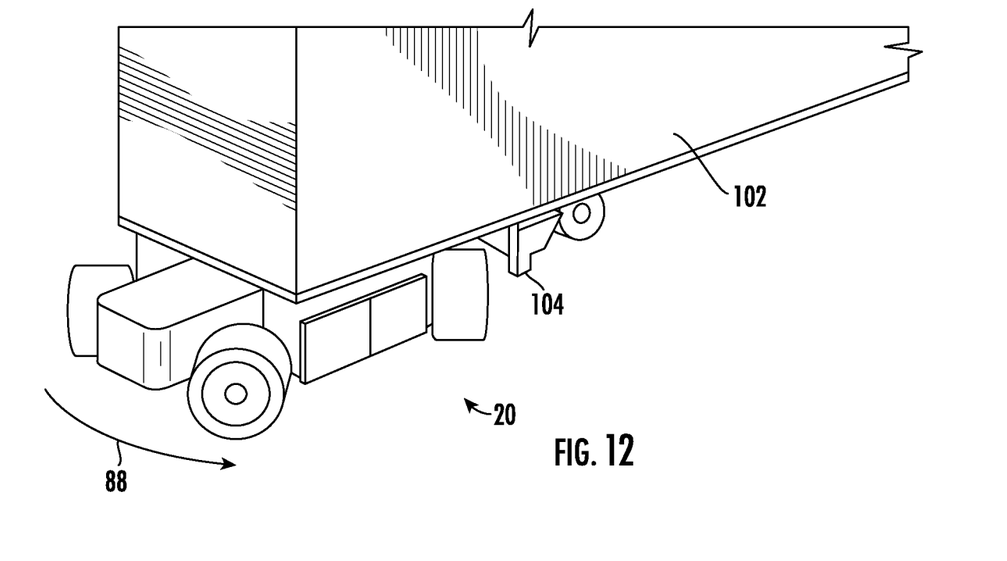
Figure 13:
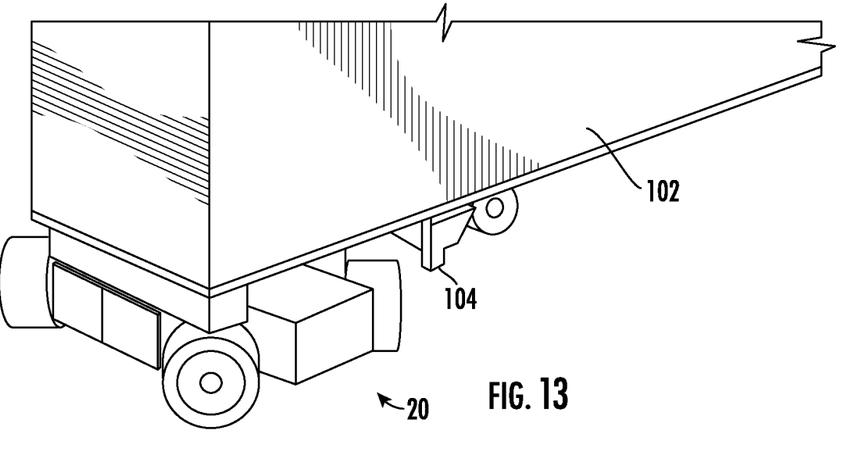
Figure 14:
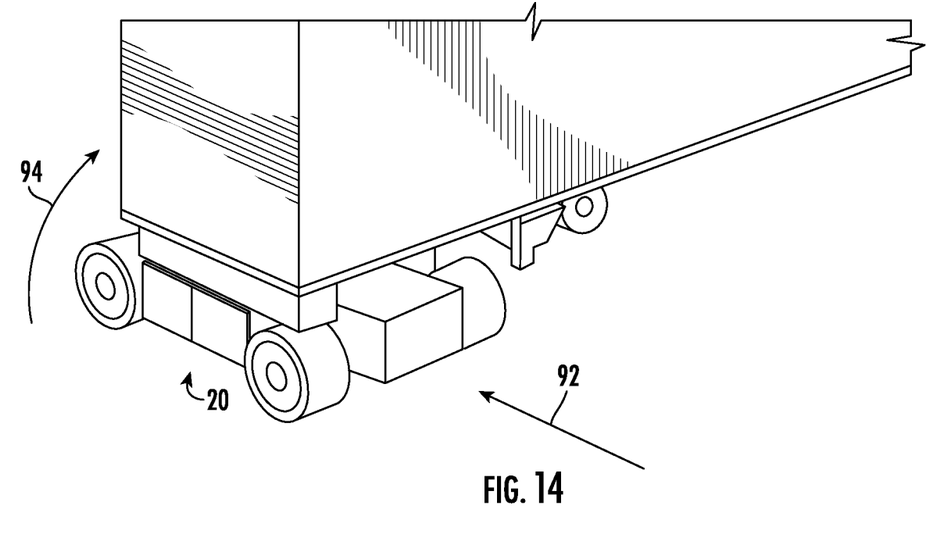

In FIG. 12, wheels 24, 26 of terminal tractor 20 have moved to their zero-point steering configuration to allow terminal tractor 20 to rotate in direction 88 about its fifth wheel coupling. In FIG. 13, terminal tractor is now in the direction of intended movement. In FIG. 14, terminal tractor 20 begins moving in direction 92, ultimately causing semi-trailer 102 to begin to turn in direction 94 as shown.

Figure 15:
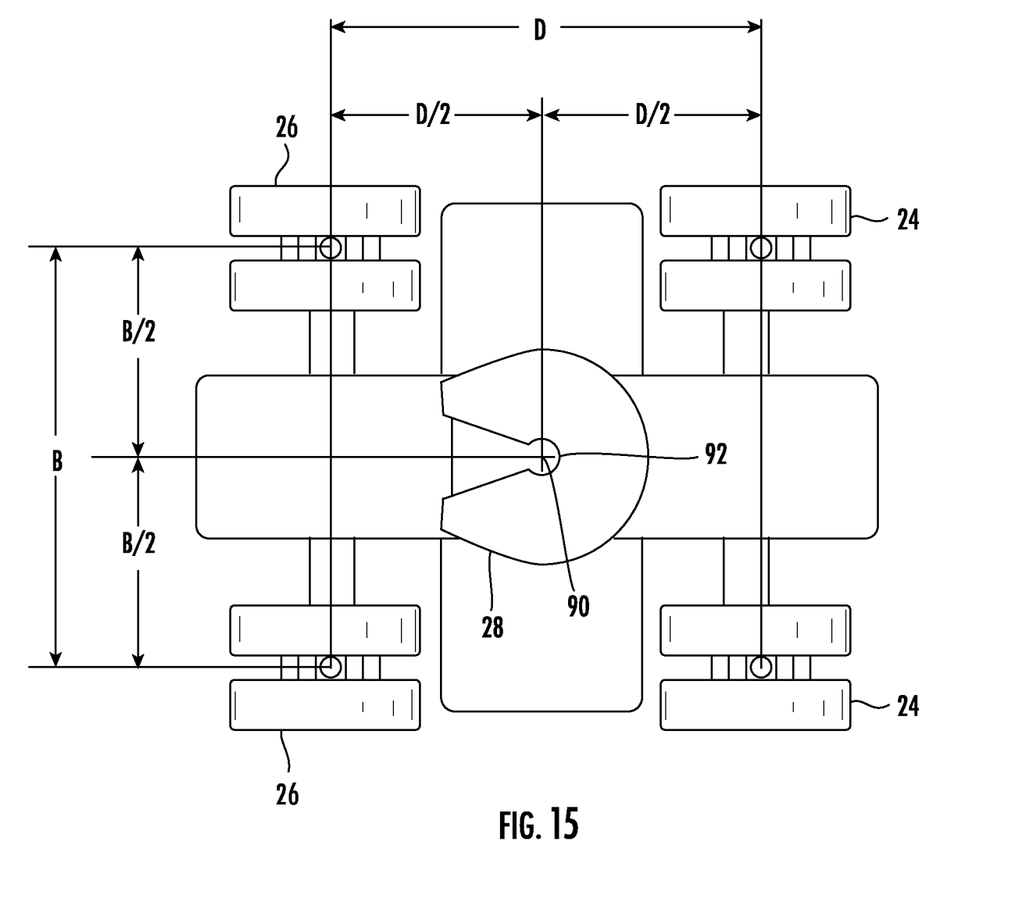
FIG. 15 is another top view schematic illustration of the terminal tractor of FIG. 1.

The aforementioned centered location of fifth wheel coupling 28 is schematically illustrated in FIG. 15. As may be seen in this view, the center 70 of each of the first pair of wheels 24 are spaced apart in the y direction a distance B, while the center 70 of each wheel 24 is spaced from center point 90 a distance of B/2. Similarly, the centers 70 of the first pair of wheels are in line with one another and spaced from the centers 70 of the second pair of wheels 26 (also in line with one another) in the x direction at distance D, while the centers of the first pair of wheels 24 are spaced from center point 90 a distance D/2 in the x direction. The same holds true for the centers 70 of wheels 26 in that they are also spaced from center point 90 at a distance D/2 in the x direction.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A terminal tractor, comprising:
   a chassis;
   a first axle mounted to the chassis, the first axle carrying a first pair of wheels;
   a second axle mounted to the chassis, the second axle carrying a second pair of wheels;
   a plurality of drive motors, wherein each drive motor is associated with each one of the first pair of wheels and with each one of the second pair of wheels, respectively, to rotate said pairs of wheels relative to their associated first or second axle;
   a plurality of steering devices, wherein each steering device is associated with each one of the first pair of wheels and with each one of the second pair wheels, respectively, to independently steer each one of the first pair of wheels and each one of the second pair of wheels;
   a controller in communication with said plurality of drive motors and said plurality of steering devices; and a fifth wheel coupling configured for coupling to a kingpin of a semi-trailer.

2. The terminal tractor of claim 1, wherein the controller is in communication with said plurality of drive motors and said plurality of steering devices to provide a drive input to each one of the plurality of drive motors and a steering input to each one of the plurality of steering devices.

3. The terminal tractor of claim 2, wherein the fifth wheel coupling includes a lifting mechanism, said lifting mechanism configured to transition a coupling body of the fifth wheel coupling from a lowered position to a raised position and from the raised position to the lowered position by moving the coupling body in a single vertical direction.

4. The terminal tractor of claim 1, further comprising a control head, said control head providing at least one of an air brake and an electrical connection for connecting to said semi-trailer.

5. The terminal tractor of claim 4, wherein said control head is foldable between upright and collapsed positions.

6. The terminal tractor of claim 1, wherein said plurality of drive motors are electric drive motors.

7. The terminal tractor of claim 1, further comprising a power source carried by the chassis, said power source providing power to said plurality of drive motors, plurality of steering devices, and controller.

8. The terminal tractor of claim 7, wherein the power source is an electric power source.

9. The terminal tractor of claim 1, wherein each one of the plurality of steering devices includes a servo motor associated with each one of first pair of wheels and each one of the pair of second wheels, respectively, such that the first pair of wheels and second pair of wheels are independently steerable.

10. A terminal tractor, comprising:
a chassis;
a first axle mounted to the chassis, the first axle carrying a first pair of wheels;
a second axle mounted to the chassis, the second axle carrying a second pair of wheels;
a plurality of drive motors;
a plurality of steering devices;
a controller in communication with said plurality of drive motors and said plurality of steering devices to provide a drive input to each one of the plurality of drive motors and a steering input to each one of the plurality of steering devices; and
a fifth wheel coupling configured for coupling to a kingpin of a semi-trailer.

11. The terminal tractor of claim 10, wherein each drive motor is associated with each one of the first pair of wheels and with each one of the second pair of wheels, respectively, to rotate said pairs of wheels relative to their associated first or second axle.

12. The terminal tractor of claim 10, wherein each steering device is associated with each one of the first pair of wheels and with each one of the second pair wheels, respectively, to independently steer each one of the first pair of wheels and each one of the second pair of wheels.

13. The terminal tractor of claim 10, wherein the controller is configured to operate the terminal tractor autonomously.

14. The terminal tractor of claim 10, wherein the controller is configured to operate the terminal tractor based upon input commands provided by a user remotely.

15. The terminal tractor of claim 10, wherein the fifth wheel coupling includes a lifting mechanism, said lifting mechanism configured to transition a coupling body of the fifth wheel coupling from a lowered position to a raised position and from the raised position to the lowered position by moving the coupling body in a single vertical direction.

16. The terminal tractor of claim 10, wherein each one of the plurality of steering devices includes a servo motor associated with each one of first pair of wheels and each one of the pair of second wheels, respectively, such that the first pair of wheels and second pair of wheels are independently steerable.

17. A terminal tractor, comprising:
a chassis;
a first axle mounted to the chassis, the first axle carrying a first pair of wheels;
a second axle mounted to the chassis, the second axle carrying a second pair of wheels;
a plurality of drive motors;
a plurality of steering devices;
a controller in communication with said plurality of drive motors and said plurality of steering devices; and
a fifth wheel coupling configured for coupling to a kingpin of a semi-trailer, said fifth wheel coupling including a lifting mechanism, said lifting mechanism configured to transition a coupling body of the fifth wheel coupling from a lowered position to a raised position and from the raised position to the lowered position by moving the coupling body in a single vertical direction.

18. The terminal tractor of claim 17, wherein each drive motor is associated with each one of the first pair of wheels and with each one of the second pair of wheels, respectively, to rotate said pairs of wheels relative to their associated first or second axle, and wherein each steering device is associated with each one of the first pair of wheels and with each one of the second pair wheels, respectively, to independently steer each one of the first pair of wheels and each one of the second pair of wheels.

19. The terminal tractor of claim 17, wherein the controller is in communication with said plurality of drive motors and said plurality of steering devices to provide a drive input to each one of the plurality of drive motors and a steering input to each one of the plurality of steering devices.

20. The terminal tractor of claim 17, further comprising a power source carried by the chassis, said power source providing power to said plurality of drive motors, plurality of steering devices, and controller.

* * * * *